(12) United States Patent
Lewis et al.

(10) Patent No.: US 10,505,754 B2
(45) Date of Patent: Dec. 10, 2019

(54) SYSTEMS AND METHODS OF CONTROLLING RETAIL STORE ENVIRONMENT CUSTOMER STIMULI

(71) Applicant: Walmart Apollo, LLC, Bentonville, AR (US)

(72) Inventors: Steven J. Lewis, Bentonville, AR (US); Matthew A. Jones, Bentonville, AR (US); Nicholaus A. Jones, Fayetteville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/136,733

(22) Filed: Sep. 20, 2018

(65) Prior Publication Data

US 2019/0097826 A1  Mar. 28, 2019

Related U.S. Application Data

(60) Provisional application No. 62/563,214, filed on Sep. 26, 2017.

(51) Int. Cl.
| | |
|---|---|
| *H04L 12/28* | (2006.01) |
| *H04L 29/08* | (2006.01) |
| *H04W 4/38* | (2018.01) |
| *H04W 4/33* | (2018.01) |

(52) U.S. Cl.
CPC .......... *H04L 12/282* (2013.01); *H04L 67/18* (2013.01); *H04L 67/22* (2013.01); *H04L 67/306* (2013.01); *H04W 4/33* (2018.02); *H04W 4/38* (2018.02)

(58) Field of Classification Search
CPC ...... H04L 12/282; H04L 67/306; H04W 4/38; H04W 4/33
See application file for complete search history.

(56) References Cited

U.S. PATENT DOCUMENTS

| | | |
|---|---|---|
| 7,606,728 B2 | 10/2009 | Sorensen |
| 7,908,237 B2 | 3/2011 | Angell |
| 7,930,204 B1 | 4/2011 | Sharma |

(Continued)

OTHER PUBLICATIONS

PCT; PCT/US2018/052374; Internationl Search Report and Written Opinion dated Dec. 10, 2018.

*Primary Examiner* — Mary Ellen Bowman
(74) *Attorney, Agent, or Firm* — Fitch, Even, Tabin & Flannery LLP (57) ABSTRACT

In some embodiments, systems and methods are provided to provide customer sensitivity retail store environment control system, comprising: a plurality of lighting systems of the store; a plurality of audio systems of the store; a mapping database; a sensitive customer database maintaining information registered customers requesting a sensitivity roaming environment zone; and a customer sensitivity environment control circuit configured to: identify a first customer in the retail store is registered as an environment sensitive customer; track movement of the first customer through the retail store; an cause some of the lighting systems and the audio systems corresponding in location to the movement of the first customer to reduce from normal lighting outputs and audio outputs, respectively, maintaining in real-time a roaming environment zone surrounding the first customer as the first customer travels through the retail store.

16 Claims, 3 Drawing Sheets

(56) References Cited

U.S. PATENT DOCUMENTS

| | | |
|---|---|---|
| 8,195,499 B2 | 6/2012 | Angell |
| 8,831,972 B2 | 9/2014 | Angell |
| 2002/0161651 A1 | 10/2002 | Godsey |
| 2006/0076908 A1 | 4/2006 | Morgan |
| 2014/0288714 A1* | 9/2014 | Poivet .................... G05B 15/02 700/275 |
| 2014/0309790 A1* | 10/2014 | Ricci ....................... H04W 4/21 700/276 |
| 2014/0376206 A1 | 12/2014 | Fisekovic |
| 2015/0178042 A1 | 6/2015 | Jacobs |
| 2015/0371302 A1* | 12/2015 | Akemann .......... G06Q 30/0613 705/26.41 |
| 2017/0300999 A1* | 10/2017 | Wilkinson ......... G06Q 30/0631 |

* cited by examiner

SYSTEMS AND METHODS OF CONTROLLING RETAIL STORE ENVIRONMENT CUSTOMER STIMULI

CROSS-REFERENCE TO RELATED APPLICATION

This application claims the benefit of U.S. Provisional Application No. 62/563,214, filed Sep. 26, 2017, which is incorporated herein by reference in its entirety.

TECHNICAL FIELD

This invention relates generally to a retail store and improve shopping experiences.

BACKGROUND

Retail stores continue to be a primary way in which people purchase products for consumption and use. Customers enter the store and often push carts or carry baskets while collecting products the customer is going to purchase. The products are distributed throughout a sales floor of the retail store and accessible for customers to retrieve. There continues to be a need to provide a positive shopping experience for customers.

BRIEF DESCRIPTION OF THE DRAWINGS

Disclosed herein are embodiments of systems, apparatuses and methods pertaining to retail stores and improve shopping experiences. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein that establish a modified local shopping environment about a customer identified as being sensitive to external stimuli, such as light and sound. This modified local shopping environment can provide improved customer satisfaction, shopping experience and shopping loyalty. Some embodiments provide customer sensitivity retail store environment control systems that include a plurality of lighting systems distributed throughout the sales area of a retail store, which are each configured to illuminate at least one known specific lighting zone of the sales area and each comprising a lighting control circuit; a plurality of audio systems positioned at known locations about the sales area of the retail store and each configured to generate audible content within audible zones and each comprising an audio control circuit and at least one acoustic generator; a mapping database maintaining retail store mapping coordinate information of at least the different lighting zones of the plurality of lighting systems and the audible zones within the sales area of the retail store; a sensitive customer database maintaining information regarding a set of registered customers requesting a sensitivity roaming environment zone of modified retail store environment while the customer is in the sales area; a customer sensitivity environment control circuit coupled with the sensitivity customer database, the mapping database, the plurality of lighting systems and the plurality of audio systems. In some embodiments, the environment control circuit is configured to: identify a first customer in the retail store is registered as an environment sensitive customer; track movement of the first customer through the retail store; and cause some of the lighting systems and the audio systems corresponding in location to the movement of the first customer to reduce, from normal, lighting outputs and audio outputs, respectively, maintaining in real-time a roaming environment zone surrounding the first customer as the first customer travels through the retail store.

Figure 1:
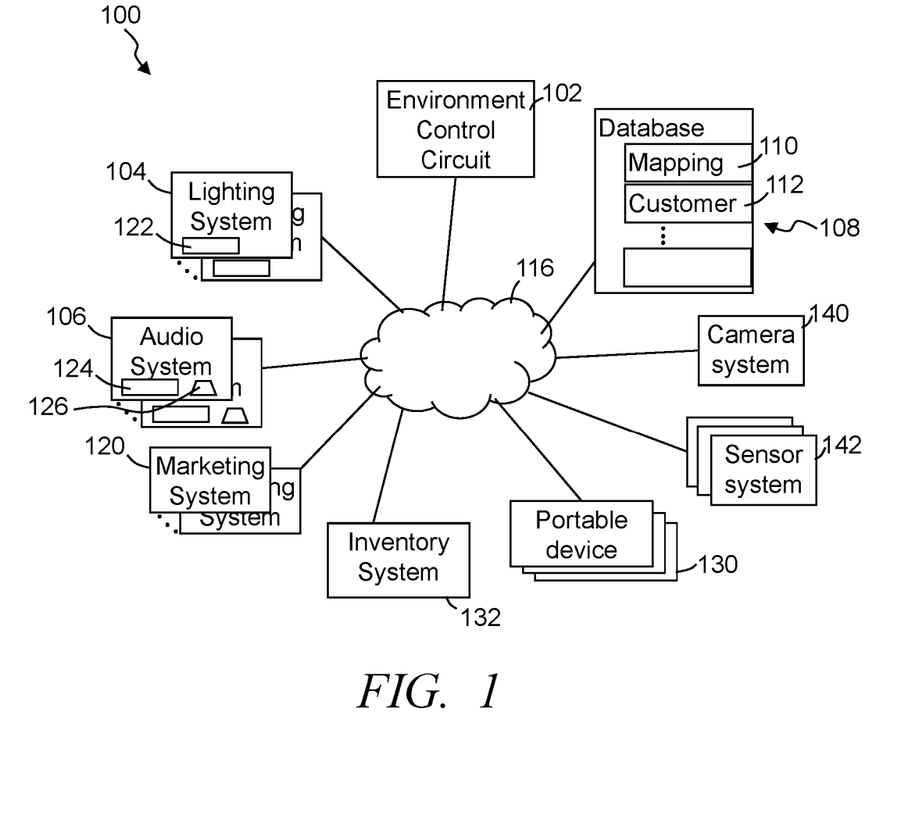
FIG. 1 illustrates a simplified block diagram of an exemplary customer sensitivity retail store environment control system including one or more customer sensitivity environment control circuits, in accordance with some embodiments.
Figure 2:
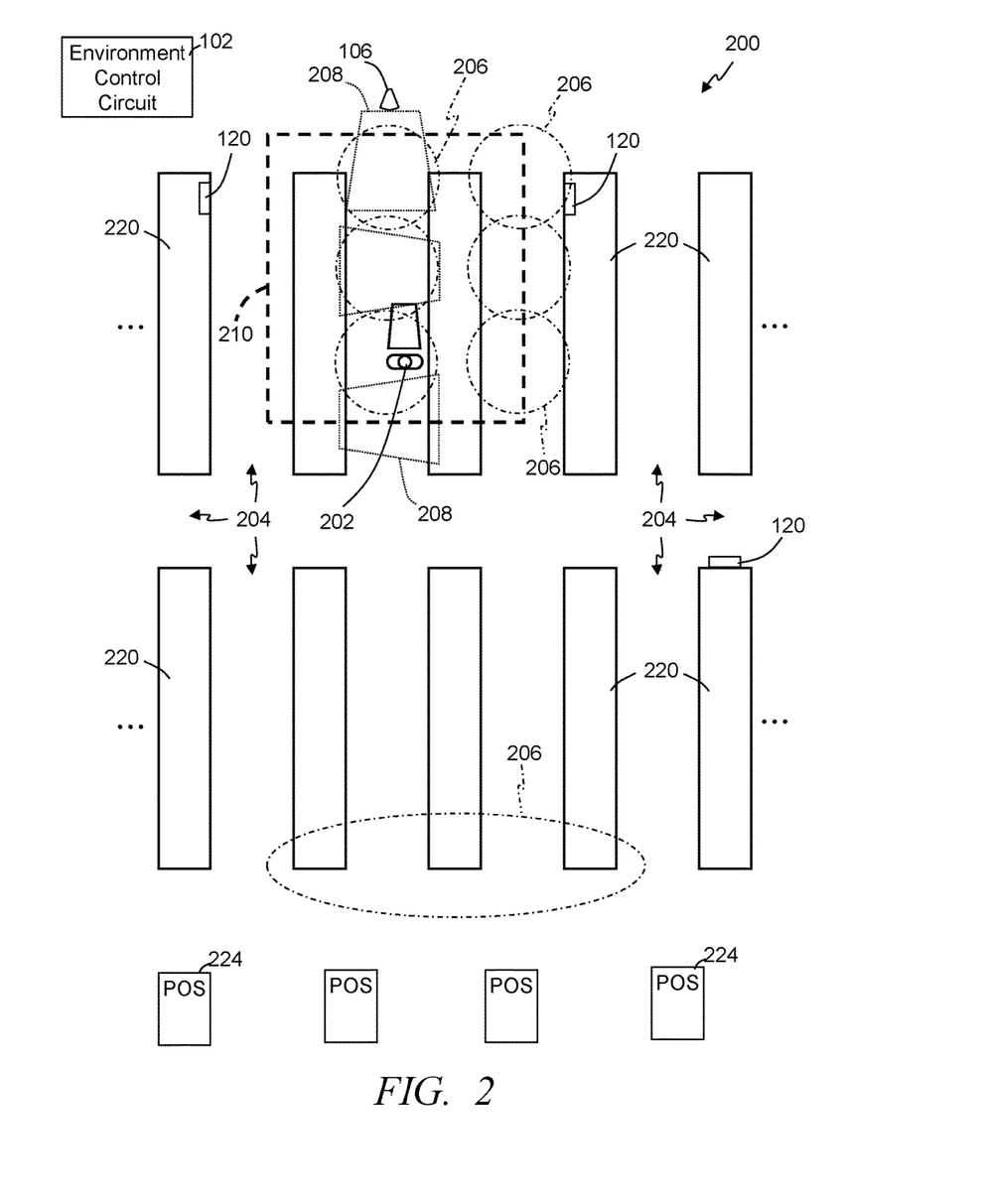
FIG. 2 illustrates a simplified overhead view of a sales area or sales floor of a retail store, in accordance with some embodiments.

FIG. 1 illustrates a simplified block diagram of an exemplary customer sensitivity retail store environment control system 100 including one or more customer sensitivity environment control circuits 102, in accordance with some embodiments. FIG. 2 illustrates a simplified overhead view of a sales area 200 or sales floor of a retail store, in accordance with some embodiments. The retail store includes product support systems 220 (e.g., shelves, shelving units, modulars, racks, etc.), with the placement of the product support devices 220 providing travel areas 204 along which people (e.g., customers, workers, etc.) can move through the retail store, with at least some of the travel areas 204 being large enough to allow shopping carts, pallet jacks, baskets, and/or other movable objects to be moved through the retail store. The retail store typically further includes multiple point-of-sale (POS) systems 224 that are configured to be used in charging customers to purchase products from the retail store. Referring to FIGS. 1-2, the environment control system 100 provides roaming environment zones 210 about sensitive customers 202 as those customers move through the retail store. In some implementations the environment control system 100 includes and/or couples with a plurality of lighting systems 104, plurality of audio systems 106, and databases 108 over one or more communication and/or computer networks 116. Often, one or more marketing systems 120 are included in the environment control system, which can further be communicatively coupled with at least one environment control circuit 102. Other stimuli systems may be controlled, such as but not limited to smell generating and/or neutralizing systems, worker's communication devices, radios, kiosks, noise dampening (e.g., for air conditioning and/or heating noise, rattling from carts, etc.), and the like. Further, the stimuli may be based on other conditions, such as cleanliness, neatness, and the like, with video analytics and/or other sensors providing information that can be used to direct instructions to workers to address such conditions (e.g., clean up an area, straighten products in an area, etc.). In some embodiments, the stimuli is learned over time based on feedback from customers, detected by various sensor systems (e.g., acoustic sensors, light sensors, etc.), and the like.

The lighting systems 104 are positioned and distributed throughout at least a sales area of the retail store. The sales area is configured to allow customers to move about the sales area and retrieve products positioned on product support systems (e.g., shelves, shelving units, modulars, racks, etc.) and available for consideration by the customers. Each of the lighting systems 104 is positioned and configured to illuminate at least one respective known specific lighting zone 206 or area of the sales area 200. FIG. 2 illustrates simplified examples of sets of lighting zones 206; however, numerous different lighting zones (not expressly illustrated) are provided in a retail store each being associated with one or more lighting systems. Further, different lighting zones may overlap some or all of one or more other lighting zones. In some implementations, the lighting zones are areas over which at least a threshold level of light (e.g. threshold lumens, threshold candle intensity, or other measure) would illuminate independent of other light sources. The level of illumination may be measured and/or estimated based on the specifications of the corresponding lighting system. Further, many, and in some instances, all of the lighting systems comprise a lighting control circuit 122 that provides control over whether the lighting system is on or off, and in some instances, when the lighting system is on at what illumination level or output is generated. For example, the lighting control circuits can dim or increase an illumination output in response to instructions from the environment control circuit 102 and/or based on a predefined schedule. In some instances, a lighting control circuit 122 may control multiple different light sources of a single lighting zone 206, while some lighting control circuits may control different light sources of different lighting zones.

The plurality of audio systems 106 are positioned at known locations about the sales area of the retail store and each configured to generate audible content within audible zones 208. The audible zones are areas within which a volume of the audible zone is at a sufficient level and/or threshold corresponding to a typical human customer being able to hear and understand the audio content emitted from the audio systems, which may be measured and/or estimated based on the specifications of the audio systems. FIG. 2 illustrates simplified examples of sets of audible zones 208; however, numerous different audio zones (not expressly illustrated) are provided in a retail store each being associated with one or more audio systems. Further, different audio zones may overlap some or all of one or more other audio zones. Typically, each audio system includes an audio control circuit 124 and at least one acoustic generator 126 (e.g., speaker, buzzer, alarm, etc.). In some instances, a single audio control circuit 124 may control multiple acoustic generators that are spaced apart, and/or control acoustic generators corresponding to different audible zones. The audio control circuits can control the corresponding one or more audio systems to control a volume and/or the content outputted.

The databases 108 include at least a mapping database 110 that stores and maintains retail store mapping coordinate information and/or location information of at least the different lighting zones 206 of the plurality of lighting systems and the audible zones 208 within the sales area 200 of the retail store. The mapping coordinate information may be defined relative to a single origin location, and/or may be defined relative to one or more other location information and/or objects within the sales area. In some instances, the mapping coordinate information defines the boundaries, intersections, area, and/or other such coordinate information. In some embodiments, the mapping database maintains coordinate information of other stimuli generating systems and/or the areas off stimuli generated by those stimuli generating systems.

The databases further include at least a sensitive customer database 112 that stores and maintains information regarding a set of registered customers requesting a sensitivity roaming environment zone 210 of modified retail store environment while the customer is in the sales area. The roaming environment zone 210 is defined relative to the registered sensitive customer and the environment control circuit 102 can communicate instructions to control lighting systems 104, audio systems 106, televisions, and other systems (e.g., marketing systems 120, points-of-sale systems, and the like) to provide a temporary modified roaming and moving environment that surrounds the registered sensitive customer and moves along with the registered sensitive customer. Further, in some instances, the environment control circuit 102 anticipates the movement of the sensitive customer to pre-emptively adjust systems to achieve a desired roaming environment zone 210 prior to the sensitive customer reaching that area and/or by the time the sensitive customer is within a threshold distance of that area. The roaming environment zone may be implemented to reduce visual and/or audio stimuli for those registered customers that have difficulty and/or experience anxiety relative to stimuli. Often such customers have difficulty or cannot effectively operate in a retail store under standard lighting and audio stimuli. Accordingly, such customers often cannot effectively shop or are limited to relatively short visits to retail stores. The environment control circuit operates, at least in part, to adjust in real-time external stimuli within one or more thresholds of the registered sensitive customers as the customers move through the retail store to allow the sensitive customers to provide these customers with a better shopping experience, increase customer loyalty, improve sales relative to these customers, and provide other such benefits. In some instances, the environment control circuit further implements the adjustments over periods of time so that the transitions between adjusted and normal levels is gradual (e.g., adjusted over 20 second period, 30 second period, or other relevant adjustment period).

The environment control circuit identifies customers as they enter the retail store and/or while in the retail store that are registered as an environment sensitive customer. Typically, sensitive customers 202 register with the retail store, an on-line service and/or other such method as a person that has sensitivities that may be accommodated. The registration can, in some implementations, accumulate customer information including but not limited to allowing the customer to specify types of stimuli of which they are sensitive, types of sensitivities, thresholds, parameters that can be used to establish thresholds, modifications to default parameter levels, and/or other such information. The customer information is associated with a unique customer identifier (e.g., a customer number), a customer bar code and/or RFID tag identifier on a customer identifying card or the like, a customer portable device 130 (e.g., smart phone, tablet, wearable device (e.g., smart glasses, smart watch, etc.), and/or identifiers that can be uniquely identified and associated with a specific customer. Accordingly, the identification of the customer may be based on the customer swiping a customer card, an RFID tag reader in the store reading a customer associated RFID tag, detecting and/or receiving a communication and/or identification of a customer's portable device, WI-FI communications, use of Bluetooth beacons throughout the store, video device for analytics, other such methods, or combination of two or more of such methods. Additionally or alternatively, the customer may be identified through facial and/or body recognition through one or more camera systems 140 of the retail store.

The movement of these sensitive customers through the retail store is tracked in real-time as the customers move. This tracking can be implemented based one or more camera systems 140, sensor systems 142 and/or other such systems. In some implementations, the tracking utilizes video and/or image processing through images and/or video captured by camera systems 140 distributed at various locations throughout the retail store. Similarly, multiple sensor systems 142 can be distributed at different locations in the retail store and can provide information that can be used to track the customer. For example, the sensor systems may include RFID tag readers, bar code readers, distance measurement systems, and/or other such sensor systems. In some instances, the tracking can be implemented at least in part through the tracking one or more RFID tags associated with a sensitive customer (e.g., a particular customer RFID tag uniquely associated with that customer, one or more RFID tags of products retrieved by that customer while at the store, an RFID tag associated with a cart being used by that customer, other such RFID tags or combination of tags), detected movement of the customer's portable device 130, receiving location information from the customer's portable device 130 (e.g., GPS data, location information detected by the customer's portable device (e.g., location data encoded in emitted light, bar code data detected by the customer's portable device, etc.), other such methods of tracking the customer, or combination of two or more of such methods of tracking. Based on the movement the of a registered sensitive customer the environment control circuit is configured to cause some of the lighting systems, the audio systems, the marketing systems, other such systems, or combination of two or more of such systems corresponding in location to the movement of the customer to be modified to achieve the desired roaming environment zone 210. For example, the environment control circuit may communicate instructions to one or more lighting systems and/or one or more audio systems corresponding to the customer's location to reduce from normal lighting outputs and audio outputs, respectively, to maintain in real-time the roaming environment zone 210 surrounding the customer as the customer travels through the retail store. The normal lighting outputs, normal audio outputs, normal marketing outputs and other such normal operations correspond to levels of output that are typically implemented while customers are in the store and the store is open for business, and when not adjusted to provide for a roaming environment zone. Additionally or alternatively, in some embodiments, the environment control circuit can control audio systems 106 to generate noise cancelling sound that can be directed at the customer and/or into the defined roaming environment zone 210 to further control the level of sound and/or level of some types of sound within the roaming environment zone.

The size and/or shape of the roaming environment zone may vary for each registered sensitive customer. Further, the size and/or shape of the roaming environment zone may be changed over time as the sensitive customer moves through the shopping facility. In some embodiments, for example, the environment control circuit may take into consideration higher concentrations of lighting systems, audio systems, marketing systems and/or other such systems and increase an area and/or extend one or more boundaries of a roaming environment zone. Similarly, the environment control circuit may increase an area and/or extend one or more boundaries of a roaming environment zone in response to detecting one or more additional customers and/or a threshold concentration of other customers and/or store workers. In other instances, the environment control circuit may reduce an area and/or draw back one or more boundaries of a roaming environment zone when the customer is in an area with lower concentrations of lighting systems, audio systems, marketing systems, other such systems, other people, and/or other such factors. In some instances, the environment control circuit may restrict a roaming environment zone 210 to a single travel area 204. Often, however, a roaming environment zone extends beyond a single travel area.

As described above, in some retail stores one or more different marketing systems may be placed at different locations through the sales area. The environment control circuit can couple with one or more of these marketing systems and can communicate commands to the marketing systems to control and/or adjust the operation of these marketing systems. In some embodiments, the environment control circuit can cause one or more marketing system of the multiple marketing systems to be temporarily disabled when a boundary of the roaming environment zone 210 moves to the location of the one or more marketing systems and/or the one or more marketing systems is within the roaming environment zone. In other implementations, the one or more marketing systems can be controlled and/or temporarily disabled when the roaming environment zone 210 is within a threshold distance of the one or more marketing systems. For example, the environment control circuit may predict the movement of a registered sensitive customer based on past movements during the current visit and/or previous visits to the store, based on a shopping list that is accessible by the environment control circuit and associated with the customer, based on historic movements of other customers and/or other such factors. Using the predicted movement, the environment control circuit can anticipate that a marketing system will enter the roaming environment zone 210, and accordingly can initiate control and/or temporarily disable the marketing system based on a threshold distance, which may be dependent on the customer's rate of speed, the level of the visual and/or audio output of the marketing system, the customer's sensitivity parameters, and/or other such factors.

Some embodiments are further configured to receive feedback from customers while the customers are within the roaming environment zone 210 regarding potential modifications to the roaming environment zone that the customer would prefer. In some implementations, for example, the environment control circuit can receive feedback from a software application (APP) implemented on a customer portable device 130 associated with a particular registered sensitive customer. Further, the feedback is normally received while the customer is within the retail store, and typically while the customer is at a location where the customer would like the adjustment to at least temporarily be implemented. For example, the customer may enter an area what has a relatively large number of somewhat reflective products, which may reflect the reduced light emitted by the controlled lighting systems. As such, the customer can communicate the feedback requesting a further reduction in lighting at least in that area. Some embodiments may further receive feedback based on bodily reactions to stimuli and/or modifications to an environment and/or a roaming environment zone. For example, in some instances, the environment control circuit may receive information from one or more wearable devices being worn by the customer (e.g., heart rate, eye positioning, eye squint, eye movement, rate of eye movement, perspiration rate, body temperature, and the like). Further, the bodily reactions may be tracked over time to detect variations, and may further consider variations relative to one or more thresholds in determining whether and/or when to implement and/or whether to make modifications to a roaming environment zone.

In some embodiments, the environment control circuit can use the customer's location at the time the feedback is transmitted and/or received based on the tracked location of the customer. As described above, the feedback may be received through the customer's portable device, while in other instances the feedback may be received through one or more interfaces and/or kiosks available in the store, store supplied portable device (e.g., tablet, product scanning device, etc.), a customer's person computer at their home, and/or other such devices, and to adjust a first sensitivity parameter within the sensitive customer database associated with the first customer, wherein sensitivity parameters define levels of lighting within the roaming environment zone, volume of sound within the roaming environment zone, and dimensions of the roaming environment zone. Some embodiments provide an Internet based user interface that is accessed over the Internet. The user interface allows the customer to submit feedback; requests modifications; adjust parameters, threshold or the like associated with that customer; and/or other such modifications. For example, in some implementations the user interface may display a mapping of the store or part of the store and allow the user to select locations where modifications are implemented. Further, for example, the mapping may identify lighting systems, audio systems, and/or other such systems, and corresponding parameters (e.g., output levels, corresponding thresholds, and the like), and allow the customer to select locations and/or systems where adjustments are desired. The system may limit one or more parameters and/or adjustments, such as setting minimum lighting thresholds below which a customer cannot request further reduction in order to achieve at least a desired level of safety. In some applications, the environment control circuit may provide information back to the customer in response to the feedback. For example, an acknowledgement may be communicated, a level of adjustment may be provided to the customer, a notification of a limit when a limit is reached, a notification of a limit when an adjustment is within a threshold of a limit, reasoning for a limit, and/or other such information. Similarly, in some implementations, the environment control circuit may provide a graphical representation (e.g., displayed through a graphical use interface of the APP, an website supplied graphical user interface, or the like) that graphically illustrates the roaming environment zone relative to the customers current location and a graphical representation of at least a portion of the retail store (e.g., a two-dimensional overhead representation, a three-dimensional overhead representation, etc.). Similarly, one or more levels of output and/or quantities of modification of output can be illustrated relative to representations of one or more lighting system 104, audio systems 106, marketing systems 120, and/or other such systems. In some instances, the levels of output and/or modifications of outputs may be illustrated in response to a customer selecting a displayed option (e.g., a displayed representation of a lighting or audio system, audio system, etc.), a customer hovering a pointer over a displayed representation of an option (e.g., a displayed representation of a lighting or audio system, audio system, etc.), or the like.

Based on the feedback and/or requests from one or more sensitive customers, the environment control circuit 102 can identify one or more lighting systems 104, one or more audio systems 106, one or more marketing systems 120, one or more other systems, or a combination of two or more of such systems that may affect an area where modifications are being requested. For example, one or more lighting systems, audio systems, marketing systems, and/or other systems may be identified that corresponding to a location of the roaming environment zone at the time the feedback is received. Those systems that correspond to the roaming environment zone 210 may include those lighting systems that direct light into the area of the store where the roaming environment zone is positioned, lighting systems that direct light within a threshold distance of the roaming environment zone, audio systems from which audio content can be detected at a threshold level within the roaming environment zone, marketing systems that can be viewed and/or heard at least at a threshold level from within the roaming environment, and other such systems that may affect the environment at least within the roaming environment zone. Again, based on the feedback, the environment control circuit may implement adjustments to one or more systems. The adjustments may be in real-time, or may be implemented upon a subsequent visit to the retail store when the sensitive customer requesting the adjustment and the corresponding roaming environment zone is positioned relative to the location where adjustments are to be implemented. In some embodiments, the environment control circuit defines the adjustment to one or more sensitivity parameters specific to at least the identified one or more lighting systems and/or at least one of the identified audio system corresponding to the location where the adjustment is requested.

In some embodiments, a default setting can be defined for each of one or more parameters associated with the different environment systems (e.g., lighting systems, audio systems, marketing systems, etc.). Further, these default settings may be may different for different customer conditions and/or sensitivities. For example, some customers may only be sensitive to light levels; other customer may be sensitive only to audio levels; still other customers may have predefined physical and/or mental conditions (e.g., autism, Asperger's syndrome, panic disorder, photosensitive epilepsy, migraines, Meniere's disease, chronic actinic dermatitis, misophonia, hyperacusis, obsessive-compulsive, etc.). Accordingly, defaults for one or more parameters may be set in accordance with different predefined sensitive customer conditions. When a customer initially registers as a sensitive customer, the customer may select (e.g., through a displayed graphical user interface accessed through the APP, over the Internet, etc.) one or more conditions affecting the customer, and default settings can automatically be applied to one or more parameters. One or more of such settings, in some implementations, may be adjusted (e.g., through the graphical user interface) by the customer based on known preferences and/or level of their condition.

In some embodiments, the environment control circuit may adjust one or more default sensitivity parameters corresponding to a set of default sensitivity parameters (e.g., default light output setting, default volume output setting, default number of lights actively on within the roaming environment zone, default size of a roaming environment zone, etc.) based on the feedback received from one or more registered sensitivity customers. This adjustment to default sensitivity parameters can be applied within the default sensitivity parameters that are assigned to one or more customers that subsequently register with a similar sensitivity, disorder, syndrome or the like.

As introduced above, customers can register with the store, a chain of stores, a third party service, or the like, as a sensitive customer. In some embodiments, the environment control circuit or a separate sensitivity registration server enables a customer to register as a sensitive customer. The registration may be through a registration graphical user interface that is accesses over the Internet, accessed through the APP, or the like. The registration graphical user interface may include customer identifying fields that allows the system to accurately identify the customer (e.g., customer number, name, address, phone number, payment method, driver's license number, other such method or combination of two or more of such methods). Further, in some embodiments, the registration graphical user interface may allow a customer to select a condition, syndrome, disorder, phobias, sensitivity, or the like. Additionally or alternatively, the registration graphical user interface may display one or more sensitivity parameters from which the customer can select and/or specify levels of sensitivity (e.g., light, sound, people, direction of travel, communicating with people, congestion, etc.). A customer profile can be updated and/or maintained in the customer database regarding the registration as a sensitive customer and the sensitivity parameters associated with that customer. As described above, one or more of the sensitivity parameters may be modified over time by the environment control circuit based on detected behaviors, feedback, and the like. The registration process allows customers to opt-in to allow the environment control system to provide a modified, limited size, moving environment zone that is maintained about the customer as the customer moves through the retail store. Some embodiments may acquire a user profile and/or sensitivity profile from a customer's portable device, a third party service, a medical service, etc. For example, some embodiments may receive a confirmation of a sensitivity based on medical prescription, notice from a medical professional, medical records, learned over time (e.g., tracking customer's bodily reactions while in the store and/or to modifications of the roaming environment zone, etc.), and the like.

The environment control circuit, in some instances, may further determine when two or more sensitivity customers are in the shopping facility at the same time, and depending on similarities between sensitivity parameters may direct customers with similar sensitivities to similar areas of store. This can include the environment control circuit identifying two or more customers registered as an environment sensitive customer that in the retail store at the same time, and can identify, from the sensitive customer database, that a set of sensitivity parameters corresponding with one customer are within a threshold of a set of sensitivity parameters corresponding to another customer. When there is a threshold correlation between sensitivity parameters, the environment control circuit may direct one or more of the registered customers to an area of the retail store that another of the registered sensitive customers is in and cluster the registered sensitive customers within the store. The directing of the sensitive customers may further take advantage of anticipated movement of one or more of the sensitivity customers. The environment control circuit may communicate one or more routing instructions to portable personal devices 130 of the one or more sensitive customers in directing the customers to cluster in one or more areas of the retail store. In some embodiments, the environment control circuit is configured to access a customer shopping list corresponding to one or more of the registered sensitive customers, and identify overlapping areas of the retail store two or more of the registered customer being clustered are to travel based on the shopping lists. In some embodiments the environment control system 100 includes an inventory system 132 that tracks inventory quantities and/or locations of products available in the retail store, ordered and/or in route to the retail store. Additionally or alternatively, the databases 108 may include an inventory database that maintains information about the products available in the retail store and inventory mapping coordinates of those products. The environment control circuit may communicate with the inventory system and/or access the inventory database in determining routing based on the inventory mapping information. Accordingly, when directing one or more customers the environment control circuit may direct a sensitive customer along the overlapping areas based on the shopping lists and the mapping information. This routing may be implemented so that the customers are in the same area at the same time, while in other instances, the routing may direct customers so that they are spaced a threshold distance (e.g., based on sensitivity parameter settings) while still being within the same area. By clustering, the system can reduce the environment modifications that are implemented in different areas of the store, while improving shopping experiences for sensitive customers and reducing other non-sensitive customers' exposure to the variations in the environment.

In some embodiments, the environment control circuit further considers other people in areas of the store in managing the roaming environment zones 210. In some implementations, for example, the environment control circuit can communicate to one or more store associates working at the retail store and direct the one or more store associates away from the roaming environment zone. As introduced above, further the environment control circuit may route the sensitive customer along a route that will reduce the customer's exposure to other customers when sensitivity parameters so indicate.

Figure 3:
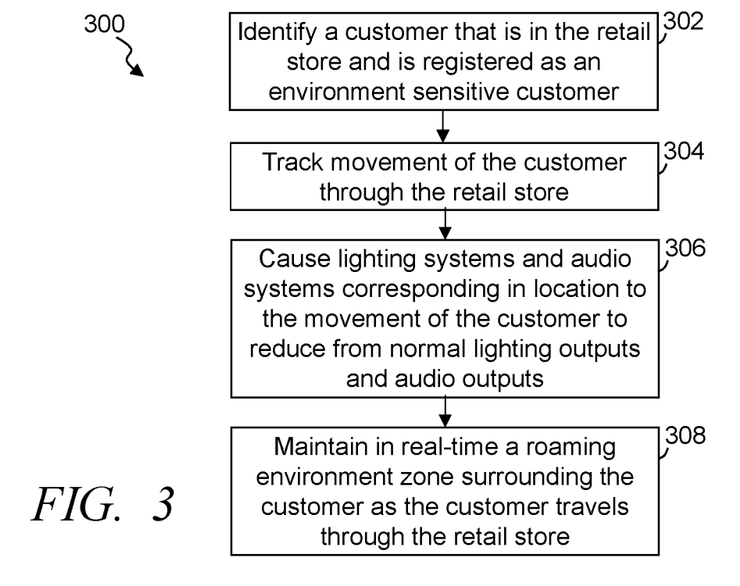
FIG. 3 illustrates a simplified flow diagram of an exemplary process of temporarily establishing within a retail store one or more limited roaming environment zones, in accordance with some embodiments.

FIG. 3 illustrates a simplified flow diagram of an exemplary process 300 of temporarily establishing within a retail store one or more limited roaming environment zones 210 each to be positioned about and/or surround a registered environment sensitive customer, in accordance with some embodiments. In step 302, the customer sensitivity environment control circuit 102 identifies a customer that is in the retail store and is registered as an environment sensitive customer based on the sensitive customer database 112 that maintains information regarding the set of registered customers requesting a sensitivity roaming environment zone of modified retail store environment while the customer is in the sales area.

In step 304, movement of one or more registered sensitive customers is tracked through the retail store. Again, the tracking may utilize camera systems 140 and image processing, facial recognition and the like, other sensors (e.g., RFID tag readers, bar code scanners, distance measurement systems, etc.), and the like. In step 306, one or more lighting systems, audio systems, marketing systems, and/or other such stimuli generating systems within the retail store that corresponds in location, based on the mapping database, to the movement of the one or more sensitive customers is caused to be modified from a normal operating state at which the system typically operates. This modification, for example, can include reduce, from normal, the lighting outputs of one or more lighting systems and/or audio outputs of audio systems.

In step 308, the roaming environment zones surrounding each of the one or more sensitive customers being tracked are maintained in real-time as the one or more customers travel through the retail store. Again, in some instances, the maintenance of the roaming environment zone about a customer may include temporarily disabling one or more marketing systems 120, of multiple marketing systems placed at different locations through the sales area 200, when the roaming environment zone is within a threshold of the relevant marketing system. Some embodiments receive feedback from an application implemented on a customer portable device associated with a registered customer and while the registered customer is within the retail store. Based on the feedback, the system implement adjustments to one or more lighting systems, audio systems, marketing systems, and/or other such systems. Similarly, in some instances, the system uses the feedback to adjust one or more sensitivity parameter within the sensitive customer database associated with the registered customer providing the feedback. Again, the sensitivity parameters define levels of lighting within the roaming environment zone, volume of sound within the roaming environment zone, dimensions of the roaming environment zone, and/or other such parameters associated with maintaining relevant roaming environment zones.

Further, some embodiments use the feedback to identify one or more lighting systems, audio systems and/or other such stimuli systems corresponding to a location of the roaming environment zone at the time the feedback is received. An adjustment can be defined to the one or more sensitivity parameters specific to one or more lighting systems, audio systems and/or other stimuli systems. Some embodiments, based on the feedback, adjust one or more default sensitivity parameters. The default sensitivity parameters can correspond to a set of default sensitivity parameters assigned to a subsequent customer that registers with a similar sensitivity. The environment control circuit 102, in some implementations is configured to identify that a second customer in the retail store is registered as an environment sensitive customer, and identify, from the sensitive customer database, that a set of sensitivity parameters corresponding with the second customer are within a threshold of a first set of sensitivity parameters corresponding to a first customer also in the store at the same time. The second customer can be directed to an area of the retail store that the first customer is in, providing a clustering of the first customer and the second customer. The use of the feedback enables the environment control circuit to learn over time the relevant settings for different mental and physical conditions of customers, and further allows the environment control circuit to make precision adjustments specific to a particular customer.

Some embodiments access a customer shopping list corresponding to multiple different registered sensitive customers that are in the retail store at the same time. One or more overlapping areas of the retail store can be identified that a first customer and a second customer are to travel based on corresponding first and second shopping lists, respectively. The environment control circuit can, in directing a customer, can directing the first and/or second customer along the overlapping areas at the same time or within a threshold separation in time so that the environment is consistent for both the first and second customers. In other instances, the environment control circuit can identify, based on the sensitivity parameters, that the first and second customers should not be close to each other, and can use the shopping list to direct the customers to different areas of the retail store so that first and second customers avoid each other. Similarly, instructions can be communicated to store associates working at the retail store directing the store associates away from a roaming environment zone 210 of a customer.

Figure 4:
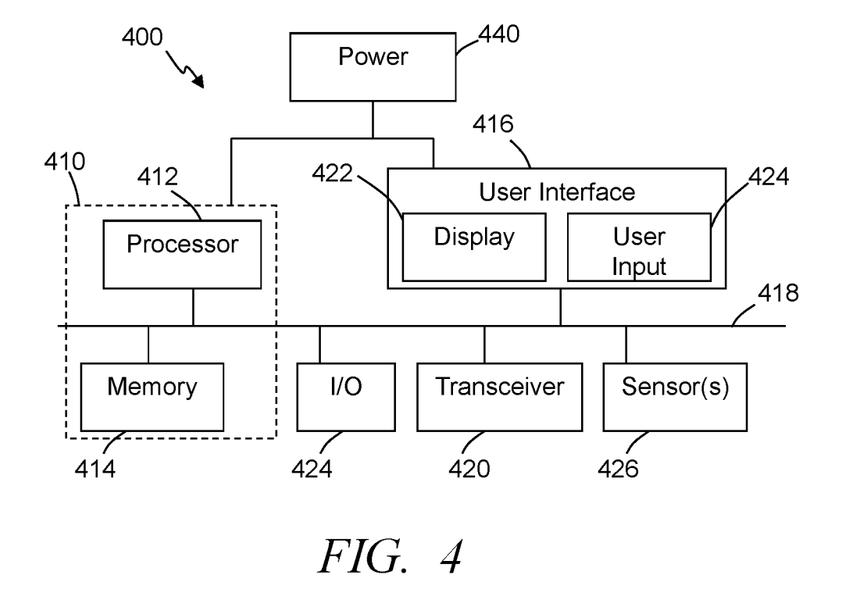
FIG. 4 illustrates an exemplary system for use in implementing methods, techniques, devices, apparatuses, systems, servers, sources and providing a roaming environment zone, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 4 illustrates an exemplary system 400 that may be used for implementing any of the components, circuits, circuitry, systems, functionality, apparatuses, processes, or devices of the environment control system 100, the circuits, and systems of the environment control system 100, and/or other above or below mentioned circuits, systems, devices, or parts of such circuits, circuitry, functionality, systems, apparatuses, processes, or devices. For example, the system 400 may be used to implement some or all of the environment control circuit 102, the lighting systems 104, the audio systems 106, the marketing systems 120, and/or other such components, circuitry, functionality and/or devices. However, the use of the system 400 or any portion thereof is certainly not required.

By way of example, the system 400 may comprise a control circuit or processor module 412, memory 414, and one or more communication links, paths, buses or the like 418. Some embodiments may include one or more user interfaces 416, and/or one or more internal and/or external power sources or supplies 440. The control circuit 412 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 412 can be part of control circuitry and/or a control system 410, which may be implemented through one or more processors with access to one or more memory 414 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 400 may be used to implement one or more of the above or below, or parts of, components, circuits, systems, processes and the like.

The user interface 416 can allow a user to interact with the system 400 and receive information through the system. In some instances, the user interface 416 includes a display 422 and/or one or more user inputs 424, such as buttons, touch screen, track ball, keyboard, mouse, etc., which can be part of or wired or wirelessly coupled with the system 400. Typically, the system 400 further includes one or more communication interfaces, ports, transceivers 420 and the like allowing the system 400 to communicate over a communication bus, a distributed computer and/or communication network 116 (e.g., a local area network (LAN), the Internet, wide area network (WAN), etc.), communication link 418, other networks or communication channels with other devices and/or other such communications or combination of two or more of such communication methods. Further the transceiver 420 can be configured for wired, wireless, optical, fiber optical cable, satellite, or other such communication configurations or combinations of two or more of such communications. Some embodiments include one or more input/output (I/O) ports 434 that allow one or more devices to couple with the system 400. The I/O ports can be substantially any relevant port or combinations of ports, such as but not limited to USB, Ethernet, or other such ports. The I/O interface 434 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 426 to provide information to the system and/or sensor information that is communicated to another component. The sensors can include substantially any relevant sensor, such as distance measurement sensors (e.g., optical units, sound/ultrasound units, etc.), optical based scanning sensors to sense and read optical patterns (e.g., bar codes), radio frequency identification (RFID) tag reader sensors capable of reading RFID tags in proximity to the sensor, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 400 comprises an example of a control and/or processor-based system with the control circuit 412. Again, the control circuit 412 can be implemented through one or more processors, controllers, central processing units, logic, software and the like. Further, in some implementations the control circuit 412 may provide multiprocessor functionality.

The memory 414, which can be accessed by the control circuit 412, typically includes one or more processor readable and/or computer readable media accessed by at least the control circuit 412, and can include volatile and/or nonvolatile media, such as RAM, ROM, EEPROM, flash memory and/or other memory technology. Further, the memory 414 is shown as internal to the control system 410; however, the memory 414 can be internal, external or a combination of internal and external memory. Similarly, some or all of the memory 414 can be internal, external or a combination of internal and external memory of the control circuit 412. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 116. The memory 414 can store code, software, executables, scripts, data, content, lists, programming, programs, log or history data, user information, customer information, product information, and the like. While FIG. 4 illustrates the various components being coupled together via a bus, it is understood that the various components may actually be coupled to the control circuit and/or one or more other components directly.

The system allows customer to opt-in as sensitive customers, and associated customer profiles are used to limit environmental stimuli. Systems that provide stimuli (lighting systems, audio systems, smell generating and/or neutralizing system, televisions, marketing systems, etc.) can be controlled in a limited area (e.g., radius, square, etc.) and such systems can be controlled (e.g., turn lights down or off, control televisions, turn down and/or off noise generating systems, audio systems to direct a sound damping beam at the customer and/or into the roaming environment area, and the like). The system can coordinate the operation of lighting systems, audio systems, marketing systems, and/or other such systems to maneuver a roaming environment area to be about the customer and follow the customer through at least some of the retail store.

Some embodiments provide customer sensitivity retail store environment control systems. The system can include a plurality of lighting systems distributed throughout the sales area of the retail store and each configured to illuminate at least one known specific lighting zone of the sales area and each comprising a lighting control circuit; a plurality of audio systems positioned at known locations about the sales area of the retail store and each configured to generate audible content within audible zones and each comprising an audio control circuit and at least one acoustic generator; a mapping database maintaining retail store mapping coordinate information of at least the different lighting zones of the plurality of lighting systems and the audible zones within the sales area of the retail store; a sensitive customer database maintaining information regarding a set of registered customers requesting a sensitivity roaming environment zone of modified retail store environment while the customer is in the sales area; a customer sensitivity environment control circuit coupled with the sensitivity customer database, the mapping database, the plurality of lighting systems and the plurality of audio systems, wherein the environment control circuit is configured to: identify a first customer in the retail store is registered as an environment sensitive customer; track movement of the first customer through the retail store; and cause some of the lighting systems and the audio systems corresponding in location to the movement of the first customer to reduce from normal lighting outputs and audio outputs, respectively, maintaining in real-time a roaming environment zone surrounding the first customer as the first customer travels through the retail store.

Other embodiments provide methods of temporarily establishing within a retail store limited roaming environment zones surrounding registered environment sensitive customers, the method comprising: identifying, by a customer sensitivity environment control circuit and based on a sensitive customer database maintaining information regarding a set of registered customers requesting a sensitivity roaming environment zone of modified retail store environment while the customer is in the sales area, a first customer that is in the retail store and is registered as an environment sensitive customer; tracking movement of the first customer through the retail store; and causing lighting systems and audio systems within the retail store and corresponding in location, based on a mapping database, to the movement of the first customer to reduce from normal lighting outputs and audio outputs, respectively; and maintaining in real-time a roaming environment zone surrounding the first customer as the first customer travels through the retail store.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A customer sensitivity retail store environment control system, comprising:
    a plurality of lighting systems distributed throughout the sales area of the retail store and each configured to illuminate at least one known specific lighting zone of the sales area and each comprising a lighting control circuit;
    a plurality of audio systems positioned at known locations about the sales area of the retail store and each configured to generate audible content within audible zones and each comprising an audio control circuit and at least one acoustic generator;
    a mapping database maintaining retail store mapping coordinate information of at least the different lighting zones of the plurality of lighting systems and the audible zones within the sales area of the retail store;
    a sensitive customer database maintaining information regarding a set of registered customers requesting a sensitivity roaming environment zone of modified retail store environment while the customer is in the sales area; and
    a customer sensitivity environment control circuit coupled with the sensitivity customer database, the mapping database, the plurality of lighting systems and the plurality of audio systems, wherein the environment control circuit is configured to:
        identify a first customer in the retail store is registered as an environment sensitive customer;
        track movement of the first customer through the retail store;
        cause some of the lighting systems and the audio systems corresponding in location to the movement of the first customer to reduce from normal lighting outputs and audio outputs, respectively, maintaining in real-time a roaming environment zone surrounding the first customer as the first customer travels through the retail store;
        receive feedback from an application implemented on a customer portable device associated with the first customer and while the first customer is within the retail store, and to adjust a first sensitivity parameter within the sensitive customer database associated with the first customer, wherein sensitivity parameters define levels of lighting within the roaming environment zone, volume of sound within the roaming environment zone, and dimensions of the roaming environment zone; and
        adjust, based on the feedback, a default sensitivity parameter corresponding to a set of default sensitivity parameters assigned to a subsequent customer that registers with a similar sensitivity.

2. The system of claim 1, wherein the environment control circuit further communicatively couples with multiple different marketing systems placed at different locations through the sales area, and temporarily disables at least a first marketing system of the multiple marketing systems when the roaming environment zone is within a threshold of the first marketing system.

3. The system of claim 1, wherein the environment control circuit is configured to identify at least one of a first lighting system and a first audio system corresponding to a location of the roaming environment zone at the time the feedback is received, and to define the adjustment to the first sensitivity parameter specific to the at least one of the first lighting system and the first audio system.

4. The system of claim 1, wherein the environment control circuit is further configured to:
    identify a second customer in the retail store is registered as an environment sensitive customer;
    identify, from the sensitive customer database, that a set of sensitivity parameters corresponding with the second customer are within a threshold of a first set of sensitivity parameters corresponding to the first customer; and
    direct the second customer to an area of the retail store that the first customer is in and clustering the first customer and the second customer.

5. The system of claim 4, wherein the environment control circuit is further configured to access a first customer shopping list corresponding to the first customer and a second customer shopping list corresponding to the second customer, and identify overlapping areas of the retail store the first customer and the second customer are to travel based on the first shopping list and the second shopping list, and in directing the second customer the environment control circuit is configured to direct the second customer along the overlapping areas.

6. The system of claim 1, wherein the environment control circuit is further configured to communicate to store associates working at the retail store and direct the store associates away from the roaming environment zone.

7. A method of temporarily establishing within a retail store limited roaming environment zones surrounding registered environment sensitive customers, the method comprising:
    identifying, by a customer sensitivity environment control circuit and based on a sensitive customer database maintaining information regarding a set of registered customers requesting a sensitivity roaming environment zone of modified retail store environment while the customer is in the sales area, a first customer that is in the retail store and is registered as an environment sensitive customer;
    tracking movement of the first customer through the retail store; and
    causing lighting systems and audio systems within the retail store and corresponding in location, based on a mapping database, to the movement of the first customer to reduce from normal lighting outputs and audio outputs, respectively;

maintaining in real-time a roaming environment zone surrounding the first customer as the first customer travels through the retail store;

receiving feedback from an application implemented on a customer portable device associated with the first customer and while the first customer is within the retail store;

adjusting a first sensitivity parameter within the sensitive customer database associated with the first customer, wherein sensitivity parameters define levels of lighting within the roaming environment zone, volume of sound within the roaming environment zone, and dimensions of the roaming environment zone; and adjusting, based on the feedback, a default sensitivity parameter corresponding to a set of default sensitivity parameters assigned to a subsequent customer that registers with a similar sensitivity.

8. The method of claim 7, further comprising:
temporarily disabling at least a first marketing system, of multiple marketing systems placed at different locations through the sales area, when the roaming environment zone is within a threshold of the first marketing system.

9. The method of claim 7, further comprising:
identifying at least one of a first lighting system and a first audio system corresponding to a location of the roaming environment zone at the time the feedback is received; and
defining the adjustment to the first sensitivity parameter specific to the at least one of the first lighting system and the first audio system.

10. The method of claim 7, further comprising:
identifying a second customer in the retail store is registered as an environment sensitive customer;
identifying, from the sensitive customer database, that a set of sensitivity parameters corresponding with the second customer are within a threshold of a first set of sensitivity parameters corresponding to the first customer; and
directing the second customer to an area of the retail store that the first customer is in and clustering the first customer and the second customer.

11. The method of claim 10, further comprising:
accessing a first customer shopping list corresponding to the first customer;
accessing a second customer shopping list corresponding to the second customer; and
identifying overlapping areas of the retail store the first customer and the second customer are to travel based on the first shopping list and the second shopping list;
wherein the directing the second customer comprises directing the second customer along the overlapping areas.

12. The method of claim 7, further comprising:
communicating to store associates working at the retail store and directing the store associates away from the roaming environment zone.

13. The system of claim 1, wherein the environment control circuit is further configured to modify a first boundary of the roaming environment zone as a function of a current location of the first customer and as a function of a concentration of lighting systems, of the plurality of lighting systems, located relative to the current location of the first customer.

14. The system of claim 13, wherein the environment control circuit is further configured to cause the customer portable device, through the application implemented on the customer portable device, to display a graphical representation of at least a part of the retail store corresponding to the current location of the first customer within the retail store and graphically illustrate the roaming environment zone relative to the current location of the first customer.

15. The system of claim 14, wherein the environment control circuit in causing the display of the graphical representation of the at least the part of the retail store is configured to illustrate representations of one or more lighting systems of the plurality of lighting systems, and display, relative to the representations of the one or more lighting system, a level of output and quantity of modification of output for one or more lighting systems corresponding to the illustrated representations of the one or more lighting systems.

16. The system of claim 1, wherein the environment control circuit is further configured to cause the customer portable device to display to the first customer a graphical representation of at least a part of the retail store corresponding to a current location of the first customer within the retail store and graphically illustrate the roaming environment zone relative to the current location of the first customer.

* * * * *